United States Patent [19]

Oeda et al.

[11] 4,311,758

[45] Jan. 19, 1982

[54] HEAT-SENSITIVE RECORD MATERIAL

[75] Inventors: Yoshitaka Oeda, Nara; Takeshi Murakami, Osaka; Hiroo Hayashi, Kyoto; Teruo Nakamura, Osaka, all of Japan

[73] Assignee: Kanzaki Paper Manufacturing Co., Ltd., Hyogo, Japan

[21] Appl. No.: 211,780

[22] Filed: Dec. 1, 1980

Related U.S. Application Data

[63] Continuation of Ser. No. 12,434, Feb. 15, 1979, abandoned, which is a continuation of Ser. No. 867,342, Jan. 5, 1978, Pat. No. 4,168,845.

[30] Foreign Application Priority Data

Jan. 7, 1977 [JP] Japan .......................... 52-980

[51] Int. Cl.³ .......................... B32B 5/16; B41M 5/18

[52] U.S. Cl. .......................... 428/341; 346/76 R; 346/135.1; 428/342; 428/537; 428/913; 428/488

[58] Field of Search .............. 428/341, 913, 914, 331, 428/342, 537; 282/27.5; 427/148, 150, 151; 346/135, 76 R

[56] References Cited

U.S. PATENT DOCUMENTS

| | | | |
|---|---|---|---|
| 3,859,112 | 1/1975 | Kohmura et al. | 428/913 X |
| 3,950,600 | 4/1976 | Knirsch et al. | 428/913 X |
| 3,988,501 | 10/1976 | Knirsch et al. | 428/913 X |
| 4,051,303 | 9/1977 | Hayashi et al. | 282/27.5 X |
| 4,115,613 | 9/1978 | Inoue et al. | 428/913 X |
| 4,154,462 | 5/1979 | Golden et al. | 282/27.5 |

FOREIGN PATENT DOCUMENTS 48-33832 5/1973 Japan .

OTHER PUBLICATIONS

Tappi Monograph Series No. 30, "Paper Coating Pigments," pp. 2–3.

Translation Abstract of Japanese Laid Open Patent Publication, No. 33,832 of 1973.

*Primary Examiner*—Thomas J. Herbert, Jr.

*Attorney, Agent, or Firm*—Morgan, Finnegan, Pine, Foley & Lee

[57] ABSTRACT

In a heat-sensitive record material comprising a base sheet and a color developing layer formed thereon, a pigment having an oil absorption within the range of 80 to 800 ml/100 g is additionally included in the color developing layer.

10 Claims, No Drawings

HEAT-SENSITIVE RECORD MATERIAL

This is a continuation, of application Ser. No. 12,434 filed Feb. 15, 1979, now abandoned which is a continuation of application Ser. No. 867,342, filed Jan. 5, 1978, U.S. Pat. No. 4,168,845.

BACKGROUND OF THE INVENTION

This invention relates to a heat-sensitive record material and particularly to a heat-sensitive record material which is adapted for a high speed and unremitting recording so that it may find its usefulness as a recording medium for information machines and instruments such as facsimiles, electronic computers and telex machines.

There is known a heat-sensitive record material comprising a base sheet having a color developing layer which includes finely divided particles of one of colorless chromogenic materials such as triphenylmethane compounds, fluoran compounds, phenothiazine compounds, auramine compounds and spiropyran compounds and finely divided particles of one of organic acceptors such as phenolic compounds, aromatic carboxylic acids and their polyvalent metal salt and/or one of inorganic acceptors such as activated clay, acid clay, attapulgite, aluminum silicate and talc. In such the heat sensitive record material like this the above mentioned two kinds of particles are, when at least one of them is melted or sublimated at an elevated temperature, brought into intimate contact with each other to develop a color.

One of the most typical heat transmission systems for developing a color image on the above mentioned heat-sensitive record material is to transfer heat to the heat-sensitive record material through the utilization of a thermal head having a number of electric resistance heating elements through which Joule heat produced by electric current pulses in response to signals to be recorded can be transmitted to the surface of the heat-sensitive record material when the thermal head is into close contact with the heat sensitive record material. An inevitable trouble with this type of heat transmission is the fact that the color developing material which is in a melted state when heated is transferred and adhered as smudges or tailings to the thermal head. The smudges or tailings adhered to the thermal head gradually and steadily grow during a continuous recording operation with the result that the thermal conductivity from the thermal head to the heat-sensitive record material is reduced. This is apparently disadvantageous since clear and distinct color images can never be expected at a high speed recording.

With an attempt to avoid the above mentioned disadvantage it has been proposed in Japan Kokai (Laid-Open Patent Publication) No. 33,832 of 1973 and U.S. Pat. No. 3,859,112 to add to the color developing layer conventioned inorganic pigments such as clay, talc, calcium carbonate and titanium oxide. In order to substantially avoid adhesion of smudges or tailings, however those conventional inorganic pigments must be used in such an extremely large amount that the image density is lowered.

Another attempt to prevent adhesion of smudges or tailings to the thermal head is to increase the amount of the binder used in the color developing layer. The attempt has also involved the lowering of the image density.

The primary object of the invention is to provide an improved heat-sensitive record material which can prevent to smudge the thermal head without sacrificing the record image density.

Another object of its invention is to provide an improved heat-sensitive record material which can satisfactorily meet the requirements of recording machines and implements in which recording is carried out at a high speed without stopping for a long time.

Other objects and advantages of the invention will be apparent from the following detailed description.

SUMMARY OF THE INVENTION

The heat-sensitive record material according to the invention comprises a base sheet and a color developing layer formed on at least one surface of the base sheet. The color developing layer includes pigment having an oil absorption value within a specifically selected range in addition to colorless chromogenic material and acceptor which is reactive with the colorless chromogenic material to develop a color. The specifically selected range of the oil absorption is 80 to 800 ml/100 g preferably 100 to 400 ml/100 g in terms of the value defined in JIS (Japan Industrial Standard) K 5101.

DETAILED DESCRIPTION OF THE INVENTION

Any of various known colorless chromogenic materials may be used for the present invention. Among them there are included, by way of examples, 3,3-bis(p-dimethylaminophenyl)-6-dimethylaminophthalide (CVL), 3,3-bis(p-dimethylaminophenyl)phthalide, 3-(p-dimethylaminophenyl)-3-(1,2-dimethylindole-3-yl)phthalide, 3-(p-dimethylaminophenyl)-3-(2-methylindole-3-yl)phthalide, 3,3-bis-(1,2-dimethylindole-3-yl)-5-dimethylaminophthalide, 3,3-bis-(1,2-dimethylindole-3-yl)-6-dimethylaminophthalide, 3,3-bis-(9-ethylcarbazole-3-yl)-5-dimethylaminophthalide, 3,3-bis-(2-phenylindole-3-yl)-5-dimethylaminophthalide, 3-p-dimethylaminophenyl-3-(1-methylpyrrole-2-yl)-6-dimethylaminophthalide, 4,4'-bis-dimethylaminobenzhydrinebenzylether, N-halophenyl-leucoauramine, N-2,4,5-trichlorophenyl-leucoauramine, rhodamine-B-anilinolactam, rhodamine-(p-nitroanilino)actam, rhodamine-(p-chloroanilino)actam, 7-dimethylamino-2-methoxyfluoran, 7-diethylamino-2-methoxyfluoran, 7-diethylamino-3-methoxyfluoran, 7-diethylamino-3-chlorofluoran, 7-diethylamino-3-chloro-2-methylfluoran, 7-diethylamino-2,3-dimethylfluoran, 7-diethylamino(3-acetylmethylamino)fluoran, 7-diethylamino-(3-methylamino)fluoran, 3,7-diethylaminofluoran, 7-diethylamino-3-(dibenzylamino)fluoran, 7-diethylamino-3-(methylbenzylamino)fluoran, 7-diethylamino-3-(chloroethylmethylamino)fluoran, 7-diethylamino-3-(diethylamino)fluoran, 2-phenylamino-3-methyl-6-(N-ethyl-N-p-toluyl-)amino-fluoran, benzoylleucomethyleneblue, p-nitrobenzyl-leucomethylene blue, 3-methyl-spirodinaphtopyrane, 3-ethyl-spiro-dinaphthopyrane, 3,3'-dichloro-spirodianaphthopyrane, 3-benzylspiro-dinaphthopyrane, 3-methyl-naphtho(3-methoxy-benzo)-spiropyrane and 3-propyl-spiro-dibenzopyrane.

The above colorless chromogenic material may be used either solely or in combination.

The acceptor as the other reactant of the heat-sensitive record material according to the invention may be either organic or inorganic.

Among organic acceptors there are included phenolic compounds, aromatic carboxylic acids and their polyvalent metal salt.

Typical phenolic compounds which can be used as acceptor are:

4-tert-butylphenol, 4-hydroxydiphenoxide, α-naphthol,
β-naphthol, 4-hydroxyacetophenol, 4-tert-octylcatechol,
2,2′dihydroxydiphenol, 2,2′-methylene-bis(4-methyl-6-tert-isobutylphenol), 4,4′-isopropylidene-bis-(2-tert-butylphenol),
4,4′-sec-butylidenediphenol, 4-phenylphenol,
4,4′-isopropylidenediphenol(bisphenol A), 2,2′-methylene-bis(4-chlorophenol), hydroquinone, 4,4′-cyclohexylidenediphenol, novolak phenol resin and other phenol polymers.

Typical aromatic carboxylic acids which can be used as acceptor are:

aromatic carboxylic acids, for example, benzoic acid,
o-toluylic acid, m-toluylic acid, p-toluylic acid, p-tert-butylbenzoic acid,
o-chlorobenzoic acid, p-chlorobenzoic acid, dichlorobenzoic acid,
trichlorobenzoic acid, phthalic acid, isophthalic acid, terephthalic acid,
2-carboxybiphenyl, 3-carboxybiphenyl, m-hydroxybenzoic acid,
p-hydroxybenzoic acid, anisic acid, p-ethoxybenzoic acid,
p-propoxybenzoic acid, p-benzyloxybenzoic acid, p-phenoxybenzoic acid,
gallic acid, anthranilic acid, m-aminobenzoic acid, p-aminobenzoic acid,
phthalic acid monoamide, phthalic acid monoanilide,
3-isopropyl-4-hydroxybenzoic acid, 3-sec-butyl-4-hydroxybenzoic acid, 3-cyclohexyl-4-hydroxybenzoic acid, 3-phenyl-4-hydroxybenzoic acid, 3-benzyl-4-hydroxybenzoic acid,
3,5-dimethyl-4-hydroxybenzoic acid, 3,5-dichloro-4-hydroxybenzoic acid, trimellitic acid, pyromellitic acid,
α-naphthoic acid, β-naphthoic acid, tetrachlorophthalic acid,
2,2′-dicarboxydiphenyl, salicyclic acid, o-cresotinic acid,
m-cresotinic acid, p-cresotinic acid, 3-ethylsalicyclic acid,
4-ethylsalicyclic acid, 3-isopropyl-salicyclic acid, 3-sec-butylsalicyclic acid,
5-sec-butyl-salicyclic acid, 3-tert-butylsalicyclic acid,
3-cyclohexyl-salicyclic acid, 5-cyclohexylsalicyclic acid,
3-phenyl-salicylic acid, 5-phenylsalicylic acid, 3-benzylsalicylic acid,
5-benzylsalicylic acid, 5-tert-octylsalicylic acid,
3-(α-methylbenzyl)salicylic acid, 5-(α-methylbenzyl)-salicylic acid,
3-nonylsalicylic acid, 5-nonylsalicylic acid, 5-(α,α-dimethylbenzyl)-salicylic acid, 3-chlorosalicylic acid, 5-chlorosalicyclic acid,
3-hydroxy-salicylic acid, 4-hydroxysalicylic acid,
5-hydroxy-salicylic acid, 6-hydroxy salicylic acid,
3-methoxysalicylic acid, 3-ethoxysalicylic acid, 4-methoxysalicylic acid,
5-methoxysalicylic acid, 5-benzyloxysalicylic acid, 5-octoxysalicylic acid, 3,5-dichlorosalicylic acid, 3-chloro-5-methylsalicylic acid,
3-chloro-5-ethylsalicylic acid, 3-chloro-5-isopropylsalicylic acid
3-chloro-5-tert-butylsalicylic acid, 3-chloro-5-cyclohexylsalicylic acid,
3-chloro-5-phenylsalicylic acid, 3-chloro-5-(α-methyl-benzyl)salicylic acid, 3-chloro-5-(α,α-dimethylbenzyl)-salicylic acid,
3-chloro-5-chlorosalicylic acid, 3,5-dimethylsalicylic acid,
3-methyl-5-tert-butylsalicylic acid, 3-isopropyl-5-tert-butylsalicylic acid, 3-isopropyl-5-cyclohexylsalicylic acid,
3-isopropyl-5-(α-methylbenzyl)-salicylic acid, 3-isopropyl-5-(α,α-dimethylbenzyl)-salicylic acid, 3-sec-butyl-5-tert-butylsalicylic acid, 3-tert-butyl-5-cyclohexylsalicylic acid, 3-tert-butyl-5-(4-tert-butylphenyl)salicylic acid, 3-(4′-tert-octyl-phenyl)-5-tert-octylsalicylic acid, 3-{4′-(α,α-dimethyl-benzyl)phenyl}-5-(α,α-dimethylbenzyl)salicylic acid, 3,5-di-α-methylbenzylsalicylic acid, 3,5-di-α,α-dimethylbenzylsalicylic acid,
3-phenyl-5-α,α-dimethylbenzylsalicylic acid, 3-hydroxysalicylic acid, 1-hydroxy-2-carboxynaphthalene, 1-hydroxy-2-carboxy-4-isopropylnaphthalene, 1-hydroxy-2-carboxyl-7-cyclohexylnaphthalene, 5-(4′-hydroxybenzyl)salicylic acid, 5-(3′-carboxyl-4′-hydroxybenzyl)salicylic acid and 3-(α,α-dimethylbenzyl)-5-{3′-carboxyl-4′-hydroxy-5-(α,α-dimethylbenzyl}salicylic acid.

Polymers of the above mentioned aromatic carboxylic acids with aldehydes or acetylene are also useful.

In addition, various polyvalent metal salts of the above mentioned phenolic compounds and aromatic carboxylic acids (including their polymers with aldehydes or acetylene) are also useful as acceptor. Among the polyvalent metals which can form such metallic salts like this there are included magnesium, aluminum, calcium, titanium, chromium, manganese, iron, cobalt, nickel, copper, zinc, silver, cadmium, tin and barium. Preferred metals are zinc, magnesium, aluminum and calcium.

Among useful inorganic acceptors there may be included activated clay, acid clay, attapulgite, bentonite, colloidal silica, aluminum silicate, magnesium, silicate, zinc silicate, tin silicate, calcined kaolin and talc.

The above enumerated acceptors may be used either solely or in combination.

The pigment particularly selected and used in the present invention should have an oil absorption within the range of 80 to 800 ml/100 g, preferably, within the range of 100 to 400 ml/100 g. The oil absorption value is defined in JIS (Japan Industrial Standard) K 5101 as follows:

$$G=(H/S)\times 100$$

wherein G is the oil absorption, H is the amount (ml) of linseed oil required for making the sample plasterizable and S is the weight (g) of the sample.

With the pigment having an oil absorption smaller than 80 ml/100 g the desired effect of substantially preventing adhesion of the smudges or tailings to the thermal head cannot be obtained, or otherwise the amount of the pigment must be so large that the record image density is lowered. The larger the oil absorption the more marvelous the effect of preventing adhesion of the smudges or tailings with use of the pigment in a reduced amount. It is desirable to use the pigment having a higher oil absorption in order to maintain the image density as desired. However, if the oil absorption of the pigment is excessively large, the amount of the binder required to be included in the color developing layer is extremely increased with the result that the image density is lowered. Accordingly, the oil absorption of the pigment used must be not larger than 800 ml/100 g.

Among the useful pigments having an oil absorption within the specified range there may be included the following compounds.

| | Oil absorption (ml/100g) |
|---|---|
| diatomaceous earth | 110–120 |
| calcined diatomaceous earth | 130–140 |
| flux-calcined diatomaceous earth | 120–160 |
| finely divided aluminum oxide anhydride | 80–250 |
| finely divided titanium oxide | 80–120 |
| magnesium carbonate | 80–150 |
| white carbon | 80–300 |
| finely divided silicon dioxide | 100–300 |
| magnesium aminosilicate | 300–400 |
| magnesium oxide | 100–150 |

The above enumerated compounds may be used either solely or in combination. Above all finely divided silicon dioxide is desirable because an increase of the amount thereof added to the color developing layer has less effect on the lowering of the image density.

The oil absorption depends on various factors such as the shape and the diameter of the particles. It may be improved by a chemical or physical treatment so as to be within the above defined range.

The pigment described may be included in the clor developing layer in any of various manners. For example, the color developing layer may be formed either by coating a surface of the base sheet with a coating composition including the colorless chromogenic material, the acceptor and the pigment described, or by first coating a surface of the base sheet with a coating composition including the colorless chromogenic material and the acceptor and then overcoating thereon a further coating composition including the pigment described, or by first coating a surface of the base sheet with a coating composition including the pigment described and then overcoating thereon a further coating composition including the colorless chromogenic material and the acceptor. The formation of a single unitary layer including the three components is most preferable because the production steps are simple and the record material having good recording characteristics is obtained.

The single unitary laer of the color developing layer including the three components may be produced by coating a suitable sheet which may be made of any of paper, plastic film, synthetic paper, metal foil and the like with a coating composition including all the above mentioned three components through the utilization of a conventional coater.

The coating amount of the color developing layer may be within the range of 1 to 15 $g/m^2$ on dry basis, preferably, within the range of 2 to 9 $g/m^2$. The amount of the pigment described may be within the range of 5 to 80% by weight, preferably, within the range of 10 to 65% by weight, on dry basis with respect to the total weight of the color developing layer.

Generally, in the color developing layer of a heat-sensitive record material the amount of the acceptor is larger than the amount of the colorless chromogenic material. Usually, the amount of the acceptor is within the range of 1 to 50 parts by weight, preferably, 4 to 10 parts by weight, per one part by weight of colorless chromogenic material.

In case where an overcoating layer of the pigment described is superposed on the coating layer of the colorless chromogenic material and the acceptor, the thickness of the superposed layer of the pigment described should be controlled so as not to prevent effective conduction of heat from the thermal head to the coating layer of the colorless chromogenic material and the acceptor. The amount of the overcoating composition including the pigment described should be controlled in accordance with the oil absorption of the pigment used. Generally speaking, the amount of the overcoating composition including the pigment described may be within the range of 1 to 15 $g/m^2$, preferably, 2 to 9 $g/m^2$ on dry basis while the coating amount of the coating composition comprising the colorless chromogenic material and the acceptor may be within the range of 1 to 15 $g/m^2$, preferably within the range of 2 to 10 $g/m^2$ on dry basis.

If an overcoating layer comprising the colorless chromogenic material and the acceptor is superposed on the coating layer of the pigment described, the amount of the pigment in the underlayer must be enough to absorp the color developing material when heat melted so as to substantially prevent adhesion thereof to the thermal head as smudges or tailings. The amount of the coating composition including the pigment described should also be controlled in accordance with the oil absorption of the pigment used. Generally speaking, the amount of the overcoating composition including the colorless chromogenic material and the acceptor may be within the range of 1 to 15 $g/m^2$, preferably, within the range of 2 to 9 $g/m^2$ on dry basis while the amount of the coating composition including the pigment described may be within the range of 1 to 20 $g/m^2$, preferably, within the range of 5 to 10 $g/m^2$ on dry basis.

Whether the color developing layer is formed by a single coating composition or by a plurality of coating composition as described in the above, various useful additives may be contained in the single or each coating composition. For example, in the coating composition a binder such as starch, modified starch, hydroxyethyl cellulose, methyl cellulose, carboxymethylcellulose, gelatin, casein, gum arabic, polyvinyl alcohol, styrene-malein anhydride copolymer emulsion, styrene-butadiene copolymer emulsion, vinylacetate-maleic anhydride copolymer emulsion, salts of polyacrylic acid may be used in an amount of 10 to 40% by weight, preferably 15 to 30% by weight with respect to the total solid amount.

In the coating composition various agents and additives may also be used. For example, in order to improve the color developing ability, enhance the light resistance and obtain matting effect inorganic metal compounds such as zinc oxide, magnesium oxide, calcium oxide, barium oxide, aluminum oxide, tin oxide, magnesium hydroxide, aluminum hydroxide, calcium hydroxide, zinc hydroxide, tin hydroxide, magnesium carbonate, zinc carbonate, calcium carbonate and inorganic pigments such as kaolin, clay, barium sulfate, zinc sulfide may be added in an amount of 0.1 to 5 parts by weight, preferably 0.2 to 2 parts by weight per one part of the acceptor used.

Further dispersing agents such as sodium dioctyl-sulfosuccinate, sodium dodecylbenzenesulfonate, sodium lauryl-alcoholsulfuric acid ester and metal salts of fatty acid, ultraviolet ray absorbing agents such as benzophenone derivatives and triazol derivatives, defoaming agents, fluorescent dyes, coloring dyes may also be added to the coating composition.

The coating composition may also contain in dispersion or emulsion including stearic acid, polyethylene, carnauba wax, paraffin wax, zinc stearate, calcium stearate, ester wax in order to prevent the heat-sensitive record material from being stuck in contact with stylus of a recording head.

In order to improve the sensitivity at lower temperatures addition of a heat fusible material which can dissolve at least one of the colorless chromogenic material and the acceptor therein, for example, stearic acid amide or 2,6-diisopropyl-naphthalene may be recommended.

DETAILED DESCRIPTION OF THE PREFERRED EMBODIMENT

The following examples serve to illustrate the invention in more detail although the invention is not limited to the examples. Unless otherwise indicated, parts and % signify parts by weight and % by weight, respectively.

EXAMPLE 1

(1) Preparation of a dye liquid:

The following composition was passed through a sand grinder.

| | |
|---|---|
| 2-phenylamino-3-methyl-6-(N-ethyl-N-p-tolyl-)aminofluoran | 25 parts |
| stearic acid amide (m.p. 99° C.) | 40 parts |
| 5% aqueous solution of methylcellulose | 200 parts |

Pulverization was continued until an average particle size of 3 microns to obtain dye liquid (I).

(2) Preparation of an acceptor liquid:

The following composition was passed through a sand grinder.

| | |
|---|---|
| 4,4'-isopropylidenediphenol (bisphenol A) | 100 parts |
| 5% aqueous solution of methylcellulose | 600 parts |
| montanic ester wax | 25 parts |

Pulverization was continued until an average particle size of 3 microns to obtain acceptor liquid (I).

(3) Making a heat-sensitive record material:

The following liquids were mixed together to prepare a coating composition.

| | |
|---|---|
| 10% aqueous dispersion of finely divided particles of silicon dioxide (having an oil absorption of 200 ml/100 g and an average particle size within the range of 0.002 to 0.11 microns) | 500 parts |
| dye liquid (I) | 100 parts |
| acceptor liquid (I) | 100 parts |

The coating composition was coated on a base sheet of 50 $g/m^2$ in an amount of 6 $g/m^2$ on dry basis to obtain a heat-sensitive record material.

EXAMPLE 2

The following liquids were mixed to prepare a coating composition.

| | |
|---|---|
| 10% aqueous dispersion of finely divided particles of silicon dioxide (having an oil a absorption of 300 ml/100 g) | 300 parts |
| dye liquid (I) | 100 parts |
| acceptor liquid (I) | 100 parts |

The coating composition was coated on a base sheet of 50 $g/m^2$ in an amount of 6 $g/m^2$ on dry basis to obtain a heat-sensitive record material.

EXAMPLE 3

(1) Preparation of a dye liquid:

The following composition was passed through a sand grinder.

| | |
|---|---|
| 2-phenylamino-3-methyl-6-(N-ethyl-N-p-tolyl-)aminofluoran | 25 parts |
| 5% aqueous solution of methylcellulose | 150 parts |
| stearic acid amide (m.p. 99° C.) | 40 parts |

Pulverization was continued until an average particle size of 3 microns to obtain dye liquid (II).

(2) Preparation of an acceptor liquid:

The following composition was passed through a sand grinder.

| | |
|---|---|
| 4,4'-isopropylidene-diphenol(bisphenol A) | 100 parts |
| 5% aqueous solution of methylcellulose | 150 parts |
| montanic ester wax | 25 parts |

Pulverization was continued until an average particle size of 3 microns to obtain acceptor liquid (II).

(3) Making a heat-sensitive record material:

The following liquids were mixed to prepare a coating composition.

| | |
|---|---|
| 30% aqueous dispersion of calcined diatomaceous earth (having an oil absorption of 110 ml/100g) | 300 parts |
| dye liquid (II) | 100 parts |
| acceptor liquid (II) | 100 parts |
| 50% emulsion of styrene-butadiene copolymer | 40 parts |

The coating composition was coated on a base sheet of 50 $g/m^2$ in an amount of 6 $g/m^2$ on dry basis to obtain a heat-sensitive record material.

EXAMPLE 4

The following liquids were mixed to prepare a coating composition.

| | |
|---|---|
| 20% aqueous dispersion of diatomaceous earth (having an oil absorption of 120 ml/100 g) | 400 parts |
| dye liquid (II) | 100 parts |
| acceptor liquid (II) | 100 parts 50% |
| 50% emulsion of styrene-butadiene copolymer | 40 parts |

The coating composition was coated on a base sheet of 50 $g/m^2$ in an amount of 6 $g/m^2$ on dry basis to obtain a heat-sensitive record material.

EXAMPLES 5 TO 8 AND CONTROLS 1 AND 2.

(1) Preparation of a dye liquid:

The following composition was passed through a sand grinder.

| | |
|---|---|
| Crystal violet lactone | 25 parts |
| 2,6-diisopropylnaphthalene(m.p. 68° C.) | 40 parts |
| 5% aqueous solution of polyvinyl alcohol | 200 parts |

Pulverization was continued until an average particle size of 3 microns to obtain dye liquid (III).

(2) Preparation of an acceptor liquid:

The following composition was passed through a sand grinder.

zinc 3-phenyl-5-α,α-dimethylbenzylsalicylate 100 parts
5% aqueous solution of polyvinyl alcohol 600 parts
zinc stearate 25 parts Pulverization was continued until an average particle size of 3 microns to obtain acceptor liquid (III).

(3) Making a heat-sensitive record material:

Dye liquid (III) and acceptor liquid (III) were mixed with a 10% aqueous dispersion of finely divided particles of silicon dioxide having an oil absorption of 200 ml/100 g in different composition ratios as shown in Table 1 to prepare six coating compositions. Each of the coating composition was coated on a base sheet of 50 g/m$^2$ in an amount of 6 g/m$^2$ on dry basis to obtain heat-sensitive record materials.

TABLE 1

| | Coating composition (parts) | | |
|---|---|---|---|
| | Dye liquid (III) | Acceptor liquid (III) | Dispersion of silicon dioxide |
| Control 1 | 100 | 100 | 15 |
| Example 5 | 100 | 100 | 60 |
| Example 6 | 100 | 100 | 200 |
| Example 7 | 100 | 100 | 500 |
| Example 8 | 100 | 100 | 1200 |
| Control 2 | 100 | 100 | 3000 |

EXAMPLE 9

100 parts of dye liquid (I) and 100 parts of acceptor liquid (I) were mixed to prepare an under-coating composition. The undercoating composition was coated on a base sheet of 50 g/m$^2$ in an amount of 3 g/m$^2$ on dry basis and dried. Then an upper-coating composition, which was prepared by mixing 85 parts of finely divided particles of silicon dioxide with an oil absorption of 200 ml/100 g with 300 parts of 5% aqueous solution of polyvinyl alcohol, was coated on the under-coating layer in an amount of 5 g/m$^2$ on dry basis to obtain a heat-sensitive record material.

EXAMPLE 10

85 parts of magnesium oxide having an oil absorption of 150 ml/100 g and 300 parts of 5% aqueous solution of polyvinyl alcohol were mixed to prepare an under-coating composition. The under-coating composition was coated on a base sheet of 50 g/m$^2$ in the weight of an amount of 7 g/m$^2$ on dry basis and dried. Then an upper-coating composition, which was prepared by mixing 100 parts of dye liquid (I) with 100 parts of acceptor liquid (I), was coated on the under-coating layer in an amount of 3 g/m$^2$ on dry basis to obtain a heat-sensitive record material.

Control 3.

The following liquids were mixed to prepare a coating composition.

40% aqueous dispersion of titanium oxide (having an oil absorption of 20 ml/100 g) 300 parts
dye liquid (I) 100 parts
acceptor liquid (I) 100 parts The coating composition was coated on a base sheet in the same manner as in Example 1.

Controls 4 to 6.

Dye liquid (I) and acceptor liquid (I) were mixed with 40% aqueous dispersion of kaolin having an oil absorption of 55 ml/100 g in such different ratios as shown in Table 2 to prepare three coating compositions. Each of the coating composition was coated on a base sheet in the same manner as in Example 1 to obtain heat-sensitive record materials.

TABLE 2

| | Coating composition (parts) | | |
|---|---|---|---|
| | Dye liquid (I) | Acceptor liquid (I) | Dispersion of kaolin |
| Control 4 | 100 | 100 | 50 |
| Control 5 | 100 | 100 | 150 |
| Control 6 | 100 | 100 | 300 |

Control 7

The following liquids were mixed to prepare a coating composition.

40% aqueous dispersion of a calcium carbonate (having an oil absorption of 30 ml/100 g) 300 parts
dye liquid (II) 100 parts
acceptor liquid (II) 100 parts
50% emulsion of styrene-butadiene copolymer 40 parts The coating composition was coated on a base sheet in the same manner as in Example 3 to obtain a heat-sensitive record material.

Control 8.

The following liquids were mixed to prepare a coating composition.

40% aqueous dispersion of clay (having an oil absorption of 40 ml/100 g) 300 parts
dye liquid (II) 100 parts
acceptor liquid (II) 100 parts
50% emulsion of styrene-butadiene copolymer 4 parts The coating composition was coated on a base sheet in the same manner as in Example 3 to obtain a heat-sensitive record material.

All-mark image was recorded on the heat-sensitive record materials obtained in Examples and Controls with the use of practical heat-sensitive facsimile KB-600 (manufactured by Tokyo Shibaura Electric Co., Ltd.) for one minute. The applied voltage was 19 V, dot density of thermal head was 5 dots/mm and line density was 4 lines/mm. The initial density of the obtained images was measured, subsequently a zigzag pattern image was recorded on 300 m of the heat-sensitive record materials and then all-mark images was recorded again for one minute. The color density of the obtained images was measured and the smudges adherent to the thermal head were checked with the eye. The color density of the images was measured by Macbeth densitometor, Model No. RD- 100R (manufactured by Macbeth Corporation, USA). The test results are shown in the Table 3. With recording on the heat-sensitive record materials in Examples, no or very few smudges adherent to the top of the thermal head, and accordingly good images with a stable color density are obtained in comparison with Controls's one.

TABLE 3

| | Initial density | Final density | Adhesion of smudges |
|---|---|---|---|
| Example 1 | 0.83 | 0.83 | ◎ |
| Example 2 | 0.89 | 0.89 | ◎ |
| Example 3 | 0.96 | 0.94 | O |
| Example 4 | 0.92 | 0.90 | O |
| Control 1 | 1.17 | 0.74 | X~Δ |
| Example 5 | 1.12 | 1.10 | O |
| Example 6 | 1.10 | 1.08 | O |
| Example 7 | 0.96 | 0.96 | ◎ |
| Example 8 | 0.85 | 0.85 | ◎ |
| Control 2 | 0.65 | 0.65 | ◎ |
| Example 9 | 0.89 | 0.89 | ◎ |
| Example 10 | 0.99 | 0.98 | O |
| Control 3 | 0.82 | 0.69 | X |

TABLE 3-continued

| | Initial density | Final density | Adhesion of smudges |
|---|---|---|---|
| Control 4 | 0.95 | 0.70 | X |
| Control 5 | 0.92 | 0.69 | X |
| Control 6 | 0.85 | 0.73 | Δ |
| Control 7 | 0.80 | 0.68 | X |
| Control 8 | 0.83 | 0.70 | X |

Note:
◎: No smudge was found.
O: Few smudges were found.
Δ: Some smudges were found on the top of the thermal head.
X: Many smudges are found on the top of the thermal head.

What we claim is:

1. In a heat-sensitive record material comprising a base sheet and a color developing layer formed on at least one surface of said base sheet, said color developing layer comprising colorless chromogenic material and acceptor which is reactive with said colorless chromogenic material to develop a color, the improvement in said color developing layer further including pigment having an oil absorption within the range of 100 to 400 ml/100 g., said pigment being a member selected from the group consisting of diatomaceous earth, calcined diatomaceous earth, flux-calcined diatomaceous earth, finely-divided aluminum oxide anhydride, finely divided titanium dioxide, white carbon, magnesium aluminosilicate, magnesium oxide and mixtures of the foregoing.

2. A heat-sensitive record material as defined in claim 1, in which said color developing layer is formed by coating on at least one surface of said base sheet a coating composition comprising said colorless chromogenic material, said acceptor and said pigment.

3. A heat-sensitive record material as defined in claim 1, in which the coating amount of said color developing layer is within the range of 1 to 15 $g/m^2$ on dry basis and said pigment is included the said color developing layer in an amount within the range of 5 to 80% by weight.

4. A heat-sensitive record material as defined in claim 3, in which the coating amount of said color developing layer is within the range of 2 to 9 $g/m^2$ on dry basis and said pigment is included in said color developing layer in an amount of 10 to 65% by weight.

5. A heat-sensitive record material as defined in claim 1, in which said color developing layer is formed by forming at least one surface of said base sheet a coating layer comprising said colorless chromogenic material and said acceptor and then superposing thereon a coating layer including said pigment.

6. A heat-sensitive record material as defined in claim 5, in which the coating amount of said coating layer comprising said colorless chromogenic material and said acceptor is 1 to 15 $g/m^2$ on dry basis and the coating amount of said coating layer including said pigment is within the range of 1 to 15 $g/m^2$ on dry basis.

7. A heat-sensitive record material as defined in claim 6, in which the coating amount of said coating layer comprising said colorless chromogenic material and said acceptor is within 2 to 10 $g/m^2$ on dry basis and the coating amount of said coating layer including said pigment is within the range of 2 to 9 $g/m^2$.

8. A heat-sensitive record material as defined in claim 1, in which said color developing layer is formed by forming on at least one surface of said base sheet a coating layer including said pigment and then superposing thereon a coating layer comprising said colorless chromogenic material and said acceptor.

9. A heat-sensitive record material as defined in claim 8, in which the coating amount of said coating layer including said pigment is within the range of 1 to 20 $g/m^2$ on dry basis and the coating amount of said coating layer comprising said colorless chromogenic material and said acceptor is within the range of 1 to 15 $g/m^2$ on dry basis.

10. A heat-sensitive record material as defined in claim 9, in which the coating amount of said coating layer including said pigment is within the range of 5 to 10 $g/m^2$ on dry basis and the coating amount of said coating layer comprising said colorless chromogenic material and said acceptor is within the range of 2 to 9 $g/m^2$ on dry basis.

* * * * *